Dec. 16, 1947.  J. V. MARTIN  2,432,672
STEEL SPRING TIRE
Filed Jan. 24, 1944  2 Sheets-Sheet 2
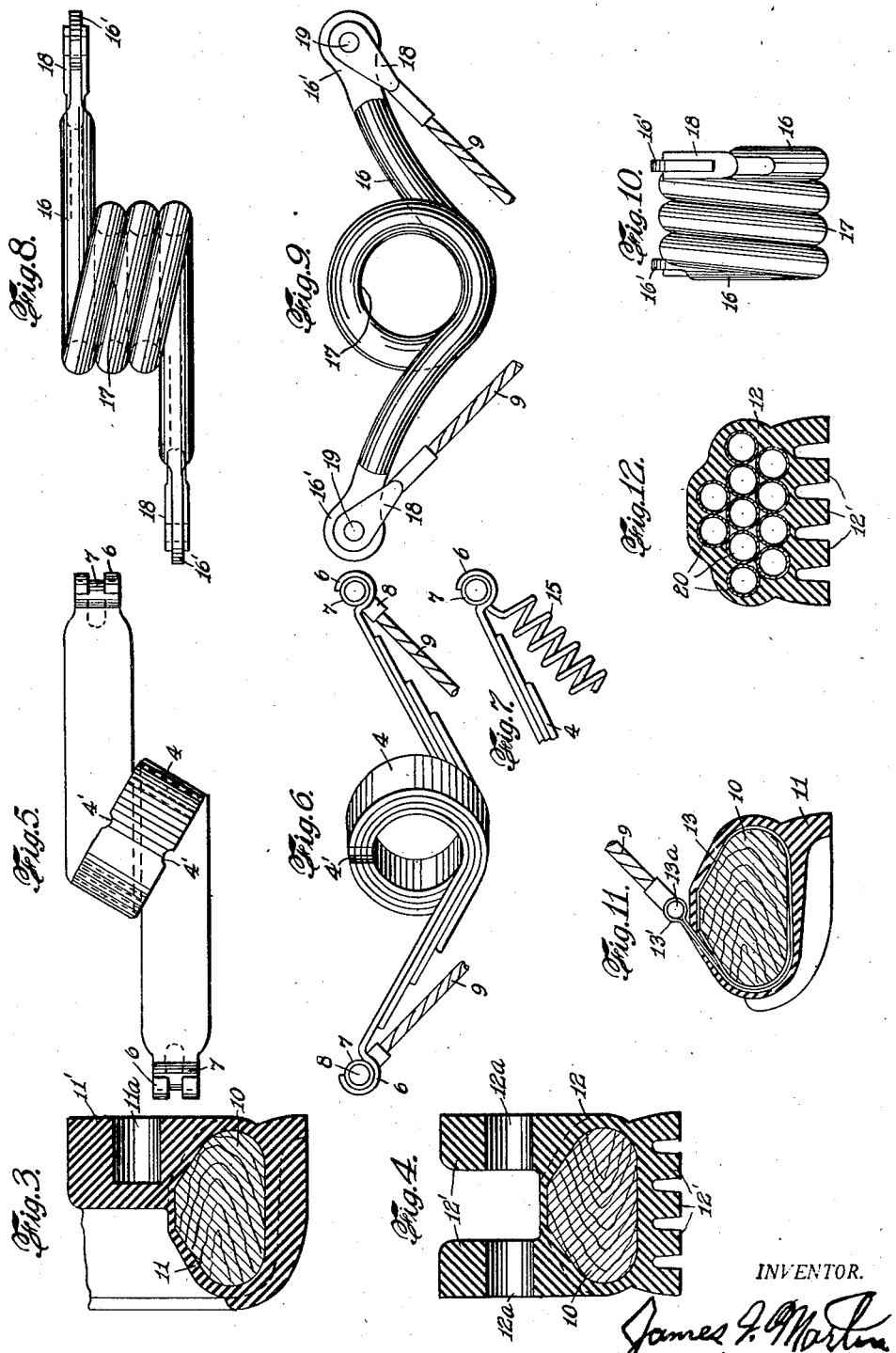
INVENTOR.
James V. Martin Patented Dec. 16, 1947

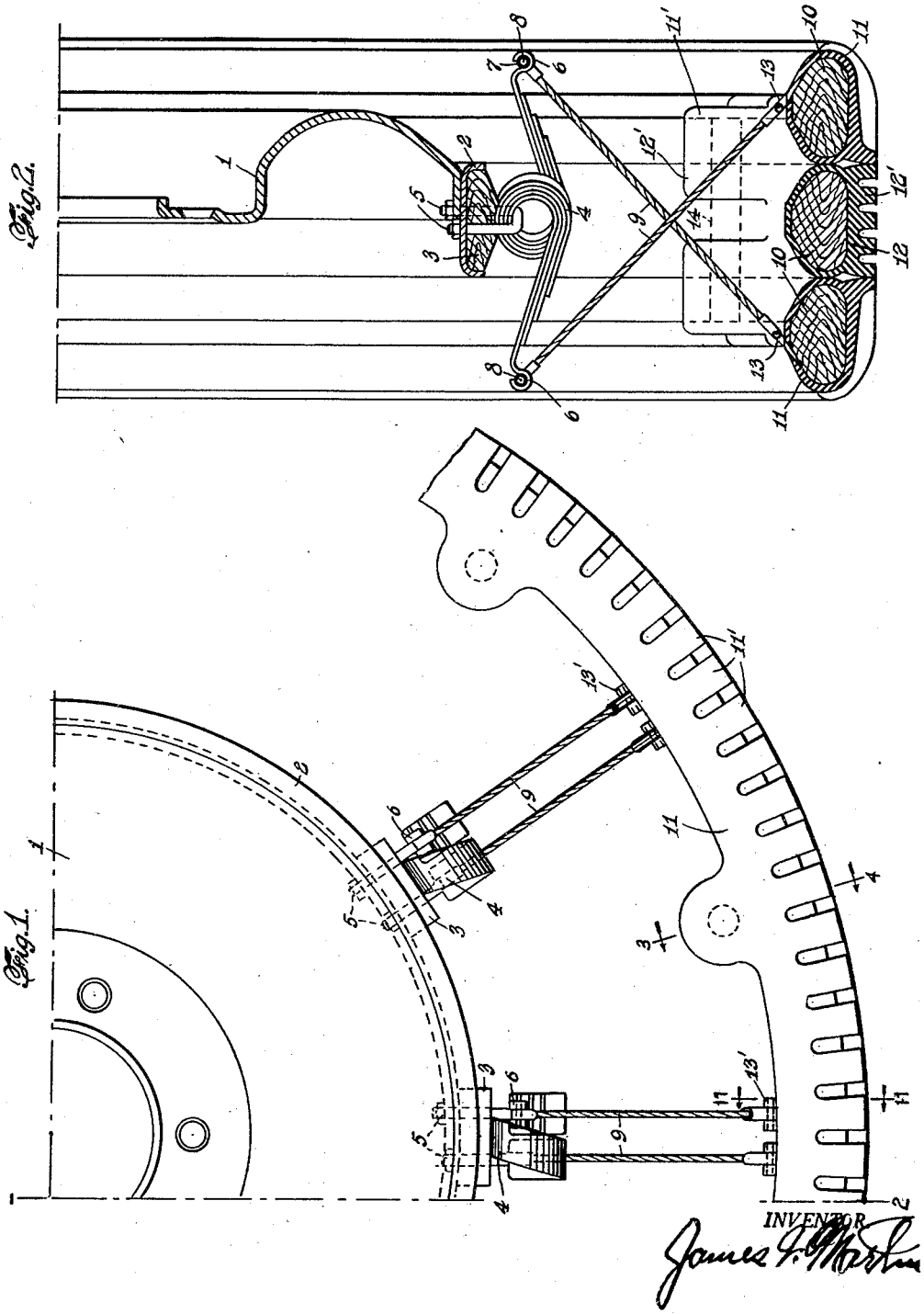

2,432,672

UNITED STATES PATENT OFFICE 2,432,672

STEEL SPRING TIRE

James V. Martin, Rochelle Park, N. J.

Application January 24, 1944, Serial No. 519,441

9 Claims. (Cl. 152—260)

This invention relates to tires for road vehicles, aeroplanes and the like. The primary object is to provide a substitute for the inflated rubber bags called pneumatic tires with their liability to puncture and blow-outs.

I wish at the outset to acknowledge that this is a much explored field and to pay tribute to thousands of prior inventors who have industrially endeavored to provide a practical substitute for the inflated type of automobile tire.

Another object of the invention is to provide a type of tire tread which will tend to hug the ground or cling to the road while the vehicle supported by such tread moves horizontally over uneven ground.

A still further object of the invention is to provide a very light resilient connection for the said tire tread to the wheel portion of a vehicle and to restrict the major part of such resiliency to movement in the vertical plane, while at the same time providing comparatively strong lateral resistance to relative movements of tire tread and wheel.

Still further objects of my invention will become readily apparent as I describe the same by means of the accompanying drawings wherein like numerals denote like parts throughout the several views.

Fig. 1 shows a view in side elevation of my invention mounted upon a commonly termed demountable automobile wheel.

Fig. 2 shows a view, partly in section taken along the line 2—2 of Fig. 1.

Fig. 3 shows a view in section taken along the line 3—4 of Fig. 1 and confined to one of the outside tread hoops of my tire assembly.

Fig. 4 is also a sectional view taken along the line 3—4 of Fig. 1, but showing the central tread hoop of my tire assembly.

Fig. 5 is a view looking down upon one of my novel coil-leaf springs such as shown toward left hand of Fig. 1.

Fig. 6 is a view of the spring shown in Fig. 5, but seen in the radial plane of the tire assembly.

Fig. 7 is a view of one end of the spring shown in Figs. 5 and 6 but indicating a coil spring attached to the said spring end.

Fig. 8 shows an alternative type of spring in a view similar to that of Fig. 5.

Fig. 9 is a view of the torsion spring as it appears in the tire radial plane.

Fig. 10 is a view looking toward the end of the spring shown in Figs. 8 and 9.

Fig. 11 is a view in section of the outside tread hoop taken along the line 11—11 of Fig. 1 and Fig. 12 is a view in section showing a center tread hoop containing a filler made up of coils of small high alloy steel tubing bonded within and to its rubber envelope.

Proceeding now to the more detailed description of my invention 1 represents the disc of a typical demountable automobile wheel having a rim 2. It will be seen that the rim indicated at 2 is only the drop center channel of the typical drop center rim used for the pneumatic tire. A maple wood block 3 forms the wheel bearing for the coil leaf springs 4 which are held in place by U-bolts 5. The coil-leaf spring takes its name from the fact that it is a coil of leaf springs, see Figs. 5 and 6, in the example illustrated four leaves of varying lengths have been clamped at their centers 4'—4' while hot and bent so that their center is in the form of a coil representing more than 360 degrees, the ends as seen in Fig. 5 extend in parallel planes, but different planes and are bent through an additional acute angle, see Fig. 6, so that the longest leaf end, on both sides comes about even with the clamped portion of the coil. The shorter leaves end progressively where they can best strengthen the lever arm from the coil 4 to the ends 6. After heat treatment I attach these coil-leaf springs to the vehicle rim in such a manner that they "unwind" in my tire assembly and tests made for me by the leading steel company of the world indicate that this particular spring will endure under more flexings in the "unwinding" direction than it will in a winding up direction.

The inner and longest of the leaves in the coil leaf spring is provided with forked hooks 6 at the ends of said spring and a fibre bearing 7 within each said hook has a T-shaped cable fitting 8 journalled within it.

Cables 9, preformed and prestretched are swaged into the said T-fitting 8 and each cable leads from its said fitting in the end of a leaf spring diagonally across a corresponding cable from the opposite end hook of the coil leaf spring 4. The opposite ends of the spring 4 are not in the same plane transverse to the radial plane of the tire and wheel, see Figs. 1, 5 and 6 and therefore the diagonally crossing cables 9 are spaced apart from each other so they do not contact even when very much relaxed. These cables 9 are quite flexible such as control cables for aircraft.

The tread portion of my tire is made up of hickory fillers 10 covered by tread envelopes 11, for the outside tread hoops and 12 for the center or inside tread hoop. The difference in the envelope, see Figs. 3 and 4 adapts each tread hoop for use either as a curb contacting outside tread hoop or as an inner or center hoop having a ribbed type tread, the ribs in planes substantially parallel with the radial plane of the wheel.

Encircling each of the outer fillers 10 is a steel band 13, see Fig. 11, this band is bifurcated at one of its ends 13' to encircle a T-shaped fitting 13a similar to the T-fitting 8 previously designated and an end of each cable 9 is swaged therein. It will be seen from Fig. 1 that the bands 13 on one side of the tire are offset in positions to correspond with the positions taken around the circle by the cables 9 as they lead to the tread hoops 11 from the spring hooks 6 at the ends of my coil-spring 4. It is contemplated that the T-connections 13' will also have fibre bushings after the fashion of 7, see Fig. 6, so that metal to metal contacts can be avoided. The central coil of the coil-leaf spring 4 is at an angle with the radial plane of the wheel and other parts of the tire as will be seen in Fig. 5 and circular cuts 4' have been made so that the U-bolt 5 can hold the center of the spring snugly in place. The maple block 3 should also be formed to fit the center coil of the spring 4.

It will be noticed that while the two outside tread hoops 11 are connected to the wheel rim 2 by means of the steel springs 4 and cables 9 the center tread hoop 12 is not directly so connected and to tie this hoop into the tire assembly I provide molded lugs 11' on each outside tread envelope and lugs 12' on the center tread envelope 12. Each of these lugs has a molded hole 12a in it and the lugs 11' have holes 11a molded in them and a simple hickory dowel pin 14 is fitted into two center tread envelope lugs 12' and each end of the said pin fits into one of the holes 11a of an outer tread hoop on each side of the tire. The holes 11a and 12a are all molded up smaller in diameter than the diameter of the hickory pin 14 so that the same must be forced into the holes for a firm fit.

The spring 4 is shown in Fig. 2 in a partly flexed state thus putting initial tension on the spring ends or hooks 6 and on the cables 9 thus the outside tread hoops or envelopes are forced tightly against the center hoop 12 and the hickory pins 14 serve to yieldably keep the tread hoops in alignment when the road surface is smooth, but permit a limited vertical displacement of the treads 11 and 12 when the road surface is uneven.

For a means of locking each end of the hickory pin 14 into each hole 11a I make reference to my Patents Nos. 2,283,274 issued May 19, 1942, entitled Safety tires and 2,331,212 issued Oct. 5, 1943, entitled Easy riding tires. The locking is not considered necessary where enough initial tension is kept on the cables 9. The amount of initial tension desired is regulated by fixing the lengths of the cables. The spring ends can be outwardly deflected sufficiently to insert the T-fitting 8 when assembling the elements of my tire. The rim 2 is properly the outermost part of the vehicle wheel; the springs 4 and their cable connections are a part of my tire replacing the portion of an inflated tire known as the casing with its inner tube, while my tread envelopes 11 and 12 with their inserts 10 occupy slightly more space than the tread portion of pneumatic tires.

In operation my tire is assembled with enough initial tension in the springs 4 so that the static load of the vehicle is supported at an axle position corresponding approximately to that taken when supported by pneumatic tires normally inflated. Under this condition the springs 4 at the upper portion of wheel 1 will be deflected outwardly from the axle more than they are shown to be in Fig. 2, which shows the initial tension position for all the springs when no load of vehicle is on the tire. When so loaded with the static load the springs 4 at the ground or bottom portion of my tire will have the relaxed position shown in Fig. 6. In a former and pending application, Serial No. 438,031 filed Apr. 7, 1942, I showed an arrangement of flat leaf springs attached to a vehicle wheel rim channel and the presently disclosed coil leaf spring is alleged to be an improvement over the former showing in affording a greater range of vertical movement and also in not extending laterally so much as the simple flat leaf spring. When the spring 4 has its ends 6 pulled outwardly from the wheel axis the center coil of the spring allows the ends to move outwardly toward the tread without moving outwardly relative the sides of the tire, whereas in the former application the spring ends rotated in the approximate arc of a circle.

However if more range of vertical movement is desired than that afforded by the spring 4 then in Fig. 7 I show the addition of a coil spring 15 which may be fixed into the spring end 6 in lieu of the cable T-fitting 8 and the cable 9 itself can be shortened to whatever length desired to make room for such coil springs.

The object of crossing the cables 9 from one end of the coil-leaf spring 4 to the tread hoop connection 13' on the opposite side of the tire is to give ample lateral strength to the tire.

In Figs. 8, 9 and 10 I have shown an alternative form of spring called a torsion spring 16. To substitute this type of spring for my coil leaf the U-bolt 5 should be forced around the central coil at 17 indicated in Fig. 9 and at 17 of Fig. 8. Otherwise the fitting of this spring to the wheel rim 2 and a maple block 3 can follow the teaching indicated for my coil leaf spring 4. The ends of the torsion spring can be flattened as indicated at 16' and a forked cable fitting 18 secured thereto by means of a steel pin 19.

In Fig. 12 I show an alternative filler 20 for the hickory fillers 10. The filler consists of one or more lengths of light gauge high alloy steel tubing properly heat treated after being coiled into close fitting circles as indicated by the cross sections shown in Fig. 12. The several advantages of diminishing the cross-sectional tube diameter and multiplying the number of tube circles composing a hoop filler over my former showing (U. S. Patent 2,235,378) of separate tube circles will readily appear, for example, tube fillers of only one diameter, see Figs. 1 and 10 of above cited patent, may require for strength a cross sectional tube diameter which will interfere with the range of flexibility desired and also cause early failure of the metal tube through flexing fatigue; furthermore experience with the single circles showed no end of joint failures at or near the union of the tube ends, see Fig. 16 of Patent No. 2,235,378. The coil of smaller size tubing illustrated in Fig. 12 of the present application avoids joints. The well known methods of bonding metal and rubber should be employed to mold the rubber envelope to and around the tube coils. Such a filler should be very flexible and also strong for its weight, since the bonding between the walls of the tube coils will permit a limited movement therebetween. Various plastics may substitute for the hoop fillers shown.

Having thus disclosed the structure of my invention and its mode of application what I claim as new is:

1. A wheel rim and tire combination wherein a coil-leaf spring is secured by its center coil to the said rim and the leaf ends of said spring are normally held flexed in an outward direction by flexible cables diagonally crossing each other to tire attachments adjacent the lateral tread portions of the said tire.

2. In combination with a wheel rim and a flexible hoop type of tire tread, a coil leaf spring secured at its coil center to the said rim, two flexible cables crossing each other diagonally from the laterally outer of said hoops, the inner ends of the said cables yieldably held under tension spaced apart laterally from the said rim.

3. A combination according to claim 2 and the inner and outer connections of one of said cables spaced several degrees apart in the wheel radial plane from the corresponding connections of the other said cable.

4. In combination with a vehicle wheel and a tire having flexible tread hoops, springs having two ends and a central portion bent into a substantial circle said central portion attached to the said wheel at intervals around the periphery thereof, the said ends of each of the said springs extending laterally outwardly at substantially right angles from opposite sides of the middle radial plane of said wheel and both ends of each said spring bifurcated and holding a connection leading to one of the said tread hoops.

5. In combination intermediate a vehicle wheel rim and flexible tire tread hoops, a coil-leaf spring attached to the wheel rim at its middle and having arms extending laterally one on each side of the said wheel rim and flexible means held in tension by said spring ends to draw the said hoops toward the said wheel center, whereby comparatively great radial movement can be had for the said spring arms with slight lateral movement.

6. A wheel and tire combination wherein flexible tread hoops are spaced apart from the said wheel by flexible steel cables and a coil-leaf spring connects each pair of the said cables to the said wheel, the said coil-leaf spring including one full circle coil and two oppositely disposed arms extending outwardly from the said coil and the said cables holding all of the said arms in a stressed position outwardly relative the wheel axis, the center coil portion of the said coil-leaf spring fastened to the said wheel, the said arm end portions of the said coil-leaf spring extending laterally from the radial wheel center and each arm connected to one of the said cables.

7. In combination with a vehicle wheel rim, a tire tread including three tread hoops, the outermost of said hoops spaced apart from each other by a center tread hoop and connected yieldably to the said rim by means of steel cables and a coil-leaf spring, whereby said coil-leaf spring will tension the two outside hoops toward the said wheel rim and also toward the said center hoop.

8. In combination with a vehicle wheel, a tire including flexible tread hoops, coil springs each having a central coil and two oppositely extending arms, the said central coils of the said springs attached at intermediate points on the periphery of the said wheel and at an angle which locates both of the said arms laterally outwardly of the said wheel attachments on opposite sides thereof and at points several degrees apart in radial planes of the said wheel and cables connecting said spring arm to one of the said hoops.

9. In combination with a wheel rim, a tire having flexible tread hoops, said hoops including a metal tube coiled into multiple rings fitting closely together, some of said rings encircling others and being themselves encircled by still other portions of the said coil, whereby a greater range of flexibility can be had for a given load than obtainable by larger cross sectional rings.

JAMES V. MARTIN.

REFERENCES CITED

The following references are of record in the file of this patent:

UNITED STATES PATENTS

| Number | Name | Date |
|---|---|---|
| 268,989 | Bishop | Dec. 12, 1882 |
| 679,294 | Cannaday | July 30, 1901 |
| 1,184,565 | Parks | May 23, 1916 |
| 1,287,255 | Carmona | Dec. 10, 1918 |
| 2,235,378 | Martin | Mar. 18, 1941 |
| 2,283,274 | Martin | May 9, 1942 |

FOREIGN PATENTS

| Number | Country | Date |
|---|---|---|
| 542,482 | France | 1922 |